US010957322B2

(12) United States Patent
Tsunoo et al.

(10) Patent No.: US 10,957,322 B2
(45) Date of Patent: Mar. 23, 2021

(54) SPEECH PROCESSING APPARATUS, INFORMATION PROCESSING APPARATUS, SPEECH PROCESSING METHOD, AND INFORMATION PROCESSING METHOD

(71) Applicant: SONY CORPORATION, Tokyo (JP)

(72) Inventors: Emiru Tsunoo, Tokyo (JP); Toshiyuki Kumakura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 16/325,262

(22) PCT Filed: May 31, 2017

(86) PCT No.: PCT/JP2017/020220
§ 371 (c)(1),
(2) Date: Feb. 13, 2019

(87) PCT Pub. No.: WO2018/047421
PCT Pub. Date: Mar. 15, 2018

(65) Prior Publication Data
US 2019/0189124 A1    Jun. 20, 2019

(30) Foreign Application Priority Data

Sep. 9, 2016  (JP) ................................. 2016-176188

(51) Int. Cl.
*G10L 15/22*     (2006.01)
*G10L 15/14*     (2006.01)
(Continued)

(52) U.S. Cl.
CPC .............. *G10L 15/22* (2013.01); *G10L 15/02* (2013.01); *G10L 15/04* (2013.01); *G10L 15/08* (2013.01);
(Continued)

(58) Field of Classification Search
CPC ......... G10L 15/22; G10L 15/08; G10L 15/02; G10L 15/04; G10L 15/14; G10L 15/30; G10L 2015/025
(Continued)

(56) References Cited

U.S. PATENT DOCUMENTS 6,434,521 B1 *  8/2002  Barnard ................ G10L 15/065
                                                     704/244
8,589,156 B2 *  11/2013  Burke ..................... G10L 15/30
                                                     704/231
(Continued)

FOREIGN PATENT DOCUMENTS

JP      2002-358097 A      12/2002
JP      2002358097 A  *   12/2002
(Continued)

OTHER PUBLICATIONS

International Search Report and Written Opinion of PCT Application No. PCT/JP2017/020220, dated Aug. 22, 2017, 09 pages of ISRWO.

*Primary Examiner* — Edwin S Leland, III
(74) *Attorney, Agent, or Firm* — Chip Law Group

(57) ABSTRACT

Provided is a speech processing apparatus including a word string estimation unit that estimates a word string equivalent to input speech among word strings included in dictionary data, and a calculation unit that calculates, for an element part constituting the word string estimated by the word string estimation unit, a certainty factor in which a content of the element part is equivalent to a content of a corresponding part in the input speech.

14 Claims, 11 Drawing Sheets

(51) Int. Cl.
 *G10L 15/02* (2006.01)
 *G10L 15/04* (2013.01)
 *G10L 15/30* (2013.01)
 *G10L 15/08* (2006.01)

(52) U.S. Cl.
 CPC .............. *G10L 15/14* (2013.01); *G10L 15/30* (2013.01); *G10L 2015/025* (2013.01)

(58) Field of Classification Search
 USPC .......................................................... 704/240
 See application file for complete search history.

(56) References Cited

U.S. PATENT DOCUMENTS

| | | | |
|---|---|---|---|
| 9,761,227 B1* | 9/2017 | Quillen | G10L 15/18 |
| 2001/0053974 A1* | 12/2001 | Lucke | G10L 15/187 |
| | | | 704/240 |
| 2011/0054899 A1* | 3/2011 | Phillips | G10L 15/30 |
| | | | 704/235 |
| 2011/0066634 A1* | 3/2011 | Phillips | G10L 15/22 |
| | | | 707/769 |
| 2013/0325448 A1* | 12/2013 | Levien | G10L 19/00 |
| | | | 704/201 |
| 2014/0358545 A1* | 12/2014 | Robichaud | G10L 15/18 |
| | | | 704/257 |
| 2017/0194000 A1* | 7/2017 | Itani | G10L 15/22 |
| 2017/0256270 A1* | 9/2017 | Singaraju | G10L 25/21 |
| 2019/0013008 A1* | 1/2019 | Kunitake | G10L 15/22 |
| 2019/0027130 A1* | 1/2019 | Tsunoo | G10L 15/22 |
| 2019/0189124 A1* | 6/2019 | Tsunoo | G10L 15/04 |

FOREIGN PATENT DOCUMENTS

| | | | | |
|---|---|---|---|---|
| JP | 2007-052307 A | | 3/2007 | |
| JP | 2007052307 A | * | 3/2007 | |
| JP | 2009-276495 A | | 11/2009 | |
| JP | 2009276495 A | * | 11/2009 | |
| JP | 2014-115499 A | | 6/2014 | |
| JP | -2014115499 A | * | 6/2014 | |

\* cited by examiner

SPEECH PROCESSING APPARATUS, INFORMATION PROCESSING APPARATUS, SPEECH PROCESSING METHOD, AND INFORMATION PROCESSING METHOD

CROSS REFERENCE TO RELATED APPLICATIONS

This application is a U.S. National Phase of International Patent Application No. PCT/JP2017/020220 filed on May 31, 2017, which claims priority benefit of Japanese Patent Application No. JP 2016-176188 filed in the Japan Patent Office on Sep. 9, 2016. Each of the above-referenced applications is hereby incorporated herein by reference in its entirety.

TECHNICAL FIELD

The present disclosure relates to a speech processing apparatus, an information processing apparatus, a speech processing method, and an information processing method.

BACKGROUND ART

A technology for mechanically recognizing speech uttered by a user is actively studied nowadays. The user's speech can be recognized in a local terminal or by a server over a network. In one example, the local terminal stores dictionary data, estimates a word string equivalent to input speech from the dictionary data, and calculates a certainty factor in which the estimated word string is equivalent to the input speech. Patent Literature 1 discloses recognition of a word and calculation of certainty factor (score) for input speech using dictionary data.

CITATION LIST

Patent Literature

Patent Literature 1: JP 2004-177551A

DISCLOSURE OF INVENTION

Technical Problem

However, in a method of calculating the certainty factor described above, a value that exceeds a threshold for determination can be calculated as a certainty factor in which input speech including a part of words constituting a word string included in dictionary data is equivalent to the word string even if the other words constituting the word string differ from other parts of the input speech. Accordingly, even in a case where the input speech is equivalent to a word string that is not included in the dictionary data, it is likely to be erroneously determined that the input speech is equivalent to a word string included in the dictionary data.

In view of this, the present disclosure provides a novel and improved speech processing apparatus, information processing apparatus, speech processing method, and information processing method, capable of obtaining a more precise certainty factor for an estimated word string.

Solution to Problem

According to the present disclosure, there is provided a speech processing apparatus including: a word string estimation unit configured to estimate a word string equivalent to input speech among word strings included in dictionary data; and a calculation unit configured to calculate, for an element part constituting the word string estimated by the word string estimation unit, a certainty factor in which a content of the element part is equivalent to a content of a corresponding part in the input speech.

In addition, there is provided an information processing apparatus including: an acquisition unit configured to acquire a word string obtained by estimation of input speech together with a certainty factor in which a content of an element part constituting the word string is equivalent to a content of a corresponding part in the input speech; and a determination unit configured to determine how to deal with the word string on the basis of information indicating the certainty factor acquired by the acquisition unit.

In addition, according to the present disclosure, there is provided a speech processing method including: estimating a word string equivalent to input speech among word strings included in dictionary data; and calculating, by a processor, for an element part constituting the estimated word string, a certainty factor in which a content of the element part is equivalent to a content of a corresponding part in the input speech.

In addition, according to the present disclosure, there is provided an information processing method including: acquiring a word string obtained by estimation of input speech together with a certainty factor in which a content of an element part constituting the word string is equivalent to a content of a corresponding part in the input speech; and determining, by a processor, how to deal with the word string on the basis of information indicating the acquired certainty factor.

Advantageous Effects of Invention

As described above, according to the present disclosure, it is possible to obtain a more precise certainty factor for an estimated word string.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
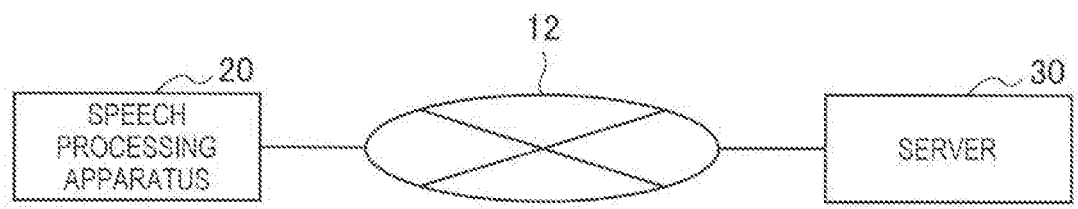
FIG. 1 is a diagram illustrated to describe a speech processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, the present disclosure will be described in the order of items shown below.
1. Overview of speech processing system
2. Configuration of speech processing apparatus and server
3. Details of speech processing unit
4. Operation
5. Application example
6. Hardware configuration
7. Concluding remarks <1. Overview of Speech Processing System>

The embodiment of the present disclosure relates to a speech processing system for mechanically recognizing speech uttered by a user. The speech processing system can perform various types of processing on the basis of a result obtained by recognizing the speech uttered by the user. An overview of the speech processing system according to the embodiment of the present disclosure is described below with reference to FIG. 1.

FIG. 1 is a diagram illustrated to describe the speech processing system according to the embodiment of the present disclosure. As illustrated in FIG. 1, the speech processing system according to the embodiment of the present disclosure has a speech processing apparatus 20 and a server 30. The speech processing apparatus 20 and the server 30 are connected to each other via a communication network 12.

The communication network 12 is a wired or wireless transmission channel of information transmitted from a device connected to the communication network 12. In one example, the communication network 12 can include a public line network such as the Internet, telephone networks, and satellite communication networks, or various local area networks (LANs) and wide area networks (WANs) including Ethernet (registered trademark). In addition, the communication network 12 can include a leased line network such as Internet protocol-virtual private network (IP-VPN).

The speech processing apparatus 20 converts speech uttered by a user into speech data that is an electrical signal, recognizes the speech data, and executes processing corresponding to a recognition result of the speech data. In one example, in a case where the speech processing apparatus 20 has a content playback function, the speech processing apparatus 20 can start the playback of music on the basis of recognition of speech data of "Play music". In this way, the user is capable of operating the speech processing apparatus 20 by speech, so the intuitive operation and hands-free operation are achieved. In one example, the user can perform an operation while jogging or sports, or perform an operation while driving a car.

Further, the speech processing apparatus 20 according to the present embodiment is capable of cooperating with the server 30 for speech recognition. In one example, the speech processing apparatus 20 is capable of transmitting the speech data to the server 30 via the communication network 12 and receiving the recognition result of the speech data from the server 30. In the following description, an operation mode in which the speech recognition is performed in both the speech processing apparatus 20 and the server 30 is referred to as a hybrid mode, and an operation mode in which the speech recognition is performed in the speech processing apparatus 20 but not performed in the server 30 is referred to as a local mode.

Moreover, the speech processing apparatus 20 can be implemented in various forms. In one example, the speech processing apparatus 20 may be a mobile phone, a smartphone, a personal computer (PC), a game console, a video playback device, or a wearable device. Examples of the wearable device include a wristwatch-type device, an earphone-type device, a headphone-type device, a head-mounted display, a necklace-type device, and the like.

The server 30 recognizes the speech data received from the speech processing apparatus 20 and transmits the recognition result to the speech processing apparatus 20. The recognition result of the speech data transmitted from the server 30 may be information based on the speech recognition, such as text indicating contents of the speech or a command directed to the speech processing apparatus 20. In one example, in a case where the speech data of "Play music of artist A" is recognized by the server 30, the recognition result of the speech data may be the text of "Play music of artist A", or may be a command instructing the speech processing apparatus 20 to play back the music of the artist A.

Moreover, in a case where the speech processing apparatus 20 such as mobile phones or portable devices performs speech recognition, the speech processing apparatus 20 is limited in the amount to be processed, so the speech recognition is performed by using dictionary data smaller than the dictionary data held in the server 30. In one example, the dictionary data held in the speech processing apparatus 20 includes vocabularies of the order of tens to hundreds. On the other hand, the server 30 has dictionary data including more vocabularies, so it is possible to support various types of utterance. However, in a case where the server 30 uses the speech recognition, the communication latency occurs between the speech processing apparatus 20 and the server 30.

(Overview of Speech Recognition)

An overview of the speech recognition performed by the speech processing apparatus 20 is now described. The speech processing apparatus 20 estimates a word string of the utterance contents from the signal waveform of the speech data. The estimation of the word string is formulated using an acoustic model and a language model as shown in Formula 1 below. Moreover, in Formula 1, X is a sequence of acoustic feature quantities and l is a word string. The word string l includes vocabularies in dictionary data used in the speech recognition. The more vocabulary in the dictionary data, the more it is possible to formally recognize parts of speech, but the amount to be processed for search operations increases.

[Math. 1]

$$\hat{l} = \underset{l}{\operatorname{argmax}} P(l/X) = \underset{l}{\operatorname{argmax}} P \frac{P(X/l)P(l)}{P(X)} \quad (1)$$

$$X = \{x_1, x_2, \ldots, x_i, \ldots\} \quad l = \{l_1, l_2, \ldots\}$$

In the above, Formula 1 indicates that some recognition results are output by combining vocabularies in the dictionary data even in a case where utterance of out-of-vocabulary (OOV) of the dictionary data is performed. An example of a method of detecting whether or not the uttered speech is out-of-vocabulary speech includes a method of preparing a garbage model P(loov) in parallel with a model P(l) for speech recognition (e.g., refer to "*A Comparison and Combination of Methods for OOV Word Detection and Word Confidence Scoring*" by Hazen and I. Bazzi, Proc. of ICASSP, pp. 397-400, 2001).

As the garbage model, in one example, a model representing a phoneme transition with n-gram probability is used. This model is expressed as Formula 2 below. In Formula 2, the phoneme string is expressed as loov $\{p_1, p_2, \ldots p_N\}$.

[Math. 2]

$$P(l_{oov}) \approx \prod_{i=1}^{N} P(p_i \mid p_{i-n+1}, \ldots, p_{i-1}) \quad (2)$$

Figure 2:
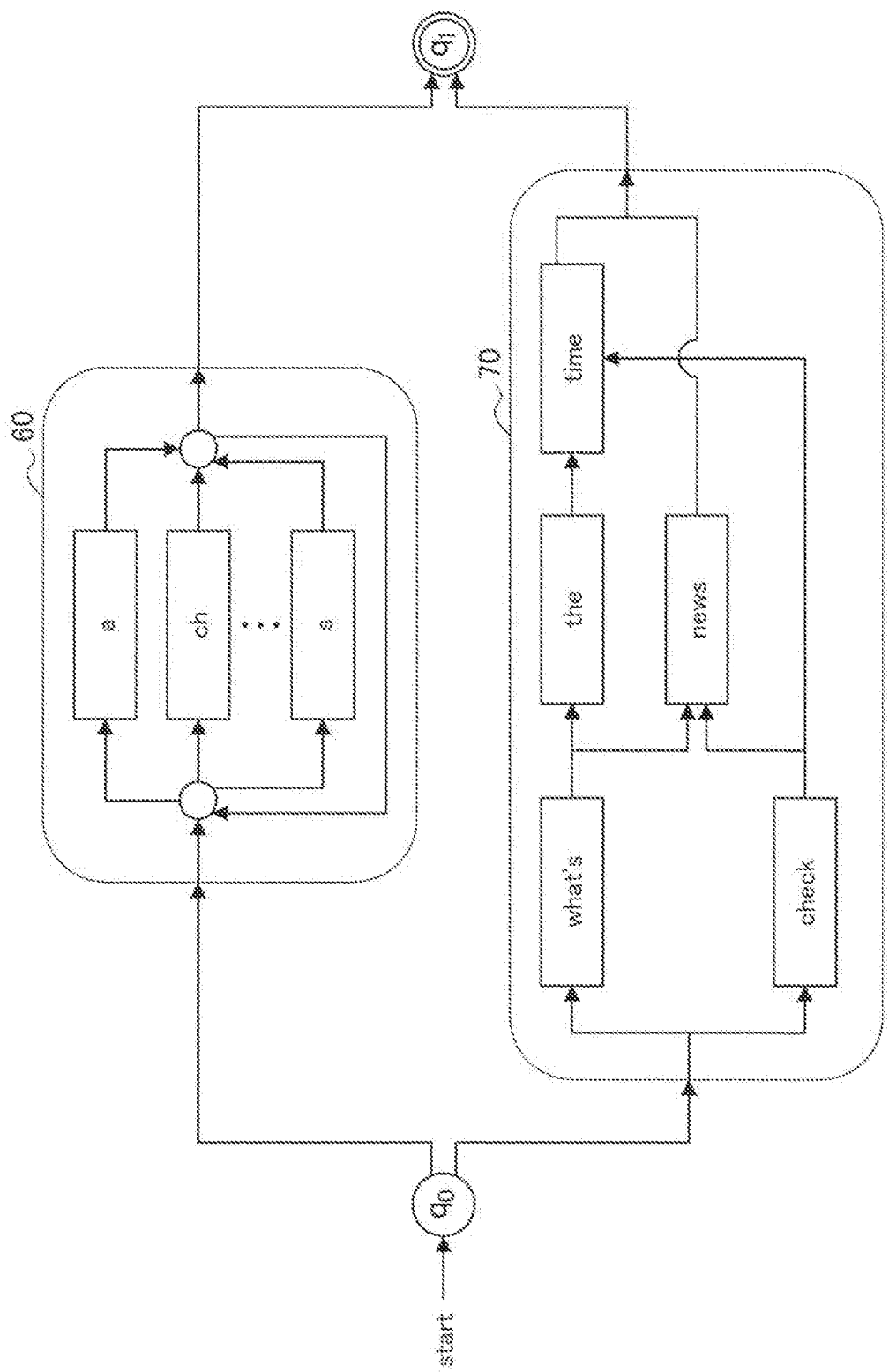
FIG. 2 is a schematic diagram illustrated to describe a method of recognizing speech.

The speech processing apparatus 20 can obtain a phoneme string that maximizes the probability (likelihood) shown in Formula 2 using Formula 3 below and can use the log likelihood difference expressed by Formula 4 as the certainty factor of the recognition result obtained by Formula 1. Moreover, this processing is expressed as illustrated in FIG. 2. In other words, the garbage model P(loov) 60 and the model P(l) 70 for speech recognition are used in parallel to obtain the certainty factor.

[Math. 3]

$$\hat{l}_{oov} = \underset{l_{oov}}{\operatorname{argmax}} P(l_{oov} \mid X) \quad (3)$$

[Math. 4]

$$\log(P(\hat{l} \mid X)) - \log(P(\hat{l}_{oov} \mid X)) \quad (4)$$

Figure 3:
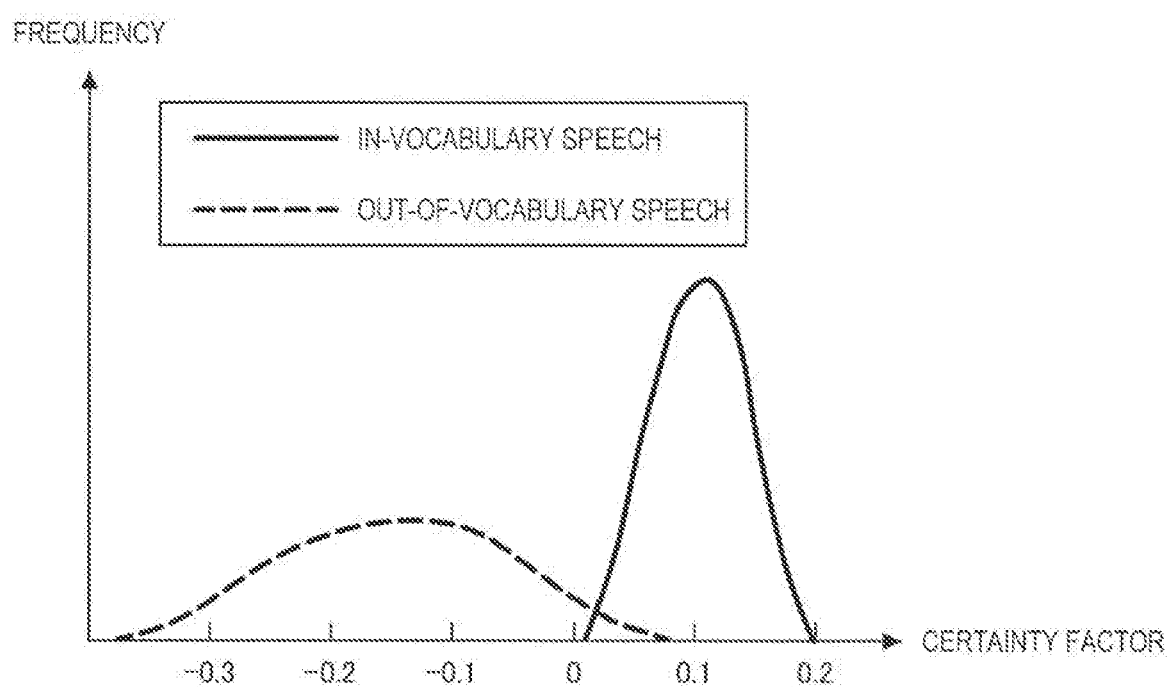
FIG. 3 is a diagram illustrated to describe an example of distribution of a certainty factor of in-vocabulary speech and a certainty factor of out-of-vocabulary speech.

The certainty factor obtained for the out-of-vocabulary speech tends to be lower than the certainty factor obtained for the in-vocabulary speech. In one example, as illustrated in FIG. 3, the certainty factor obtained for the out-of-vocabulary speech tends to be distributed mainly within the range of 0 to 0.2, and the out-of-vocabulary speech tends to be distributed mainly within the range of −0.3 to 0. Thus, it is considered that there is a method of determining whether or not the uttered speech is the in-vocabulary speech on the basis of whether or not the certainty factor exceeds a threshold.

(Background)

However, a value that exceeds a threshold can be calculated as the certainty factor where input speech including a part of words constituting a word string included in dictionary data is equivalent to the word string, even if the other words constituting the word string differ from other parts of the input speech. In one example, in a case where "check the time" for checking the current time is included in the dictionary data, a certainty factor exceeding a threshold can be calculated due to a partial overlap of the "check the time" and the utterance "check lap time" for checking the lap time of jogging. Accordingly, although the user wants to check the lap time, the current time will be fed back to the user.

Thus, the inventors have developed the speech processing apparatus 20 according to an embodiment of the present disclosure in view of the above-mentioned circumstances. The speech processing apparatus 20 according to an embodiment of the present disclosure is capable of obtaining a more precise certainty factor for a word string, thereby determining whether or not the utterance is in-vocabulary speech with more accuracy. The configuration of the speech processing apparatus 20 as described above and the server 30 that cooperates with the speech processing apparatus 20 is now described.

<2. Configuration of Speech Processing Apparatus and Server>

Figure 4:
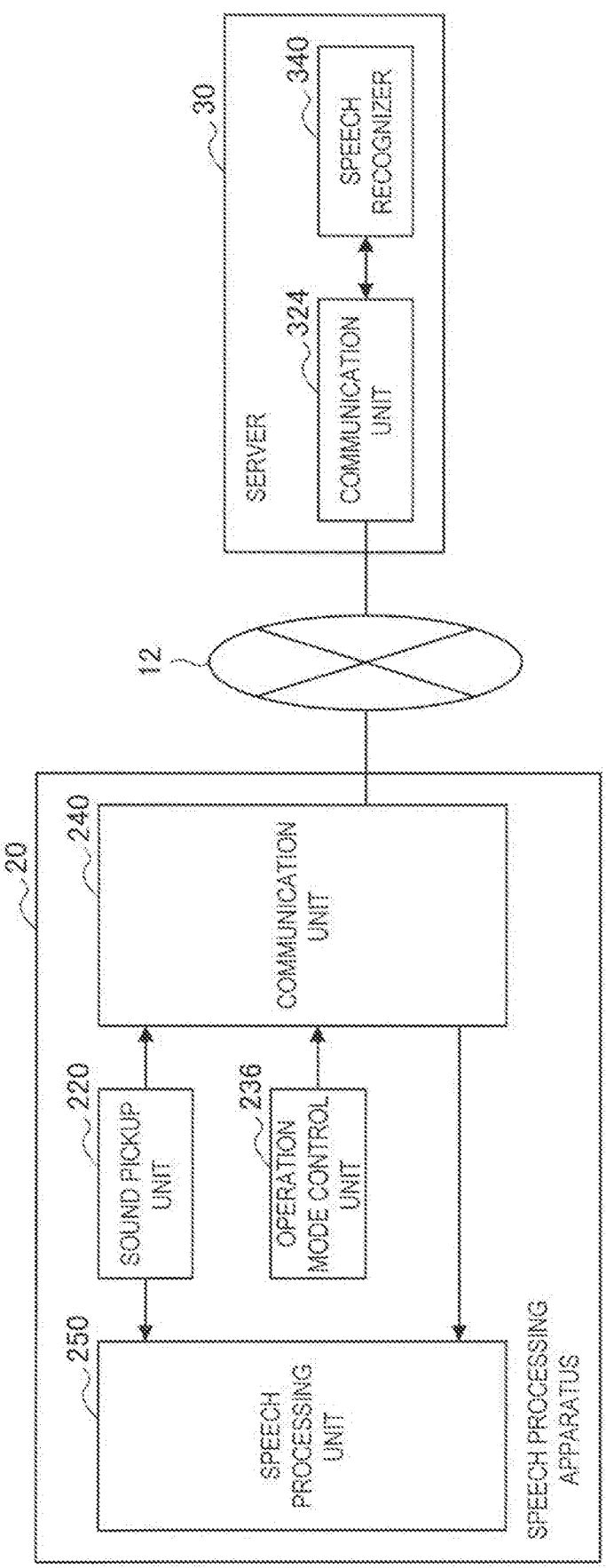
FIG. 4 is a functional block diagram of a speech processing apparatus and a server according to an embodiment of the present disclosure.

FIG. 4 is a functional block diagram of the speech processing apparatus 20 and the server 30 according to an embodiment of the present disclosure.

(Server)

As illustrated in FIG. 4, the server 30 includes a communication unit 324 and a speech recognizer 340. The communication unit 324 is an interface with the speech processing apparatus 20, receives speech data from the speech processing apparatus 20, and transmits a result obtained by recognizing the speech data by the speech recognizer 340 to the speech processing apparatus 20.

The speech recognizer 340 recognizes the speech data received from the speech processing apparatus 20 through the communication unit 324 using the dictionary data, in one example, by employing the method described in the "Overview of speech recognition" in the above description. The dictionary data used by the speech recognizer 340 includes more vocabulary data than the dictionary data used by the speech processing apparatus 20 described later. Thus, the speech recognition by the speech recognizer 340 is superior in terms of recognition precision. The recognition result obtained by the speech recognizer 340 of the server 30 is hereinafter referred to as a server recognition result.

(Speech Processing Apparatus)

The speech processing apparatus 20 includes a sound pickup unit 220, an operation mode control unit 236, a communication unit 240, and a speech processing unit 250 as illustrated in FIG. 4.

The sound pickup unit 220 converts input speech expressed by pneumatic vibration into an electrical signal. The function of the sound pickup unit 220 is implemented by, in one example, a microphone. The electrical signal (pulse-code modulation: PCM) obtained by the sound pickup unit 220 or the sequence of acoustic feature quantities of the signal is herein referred to as speech data.

The operation mode control unit 236 controls the operation mode related to the speech recognition of the speech processing apparatus 20 between the local mode and the hybrid mode. In one example, in a case where the communication unit 240 is connected to the server 30, the operation mode control unit 236 can set the operation mode to the hybrid mode. In a case where the communication unit 240 is not connected to the server 30, the operation mode control unit 236 can set the operation mode to the local mode. In addition, in a case where the remaining battery level of the speech processing apparatus 20 exceeds a predetermined value, the operation mode control unit 236 can set the operation mode to the hybrid mode. In a case where the remaining battery level is equal to or less than the predetermined value, the operation mode control unit 236 can set the operation mode to the local mode. In addition, the operation mode control unit 236 can control the operation mode in accordance with the user's operation.

The communication unit 240 is an interface with the server 30. In the hybrid mode, the communication unit 240 transmits the speech data that is input from the sound pickup unit 220 to the server 30 and receives the server recognition result from the server 30.

The speech processing unit 250 estimates a word string equivalent to the input speech collected by the sound pickup unit 220 and it calculates a certainty factor for the estimation. The speech processing unit 250 determines whether or not to use the estimated word string as the speech recognition result on the basis of the calculated certainty factor. In the case where the operation mode of the speech processing apparatus 20 is the hybrid mode, the speech processing unit 250 is also capable of determining to use the server recognition result.

<3. Details of Speech Processing Unit>

The overall configuration of the speech processing apparatus 20 and the server 30 is described above with reference to FIG. 4. Subsequently, the function of the speech processing unit 250 included in the speech processing apparatus 20 is now described in more detail with reference to FIGS. 5 to 10.

Figure 5:
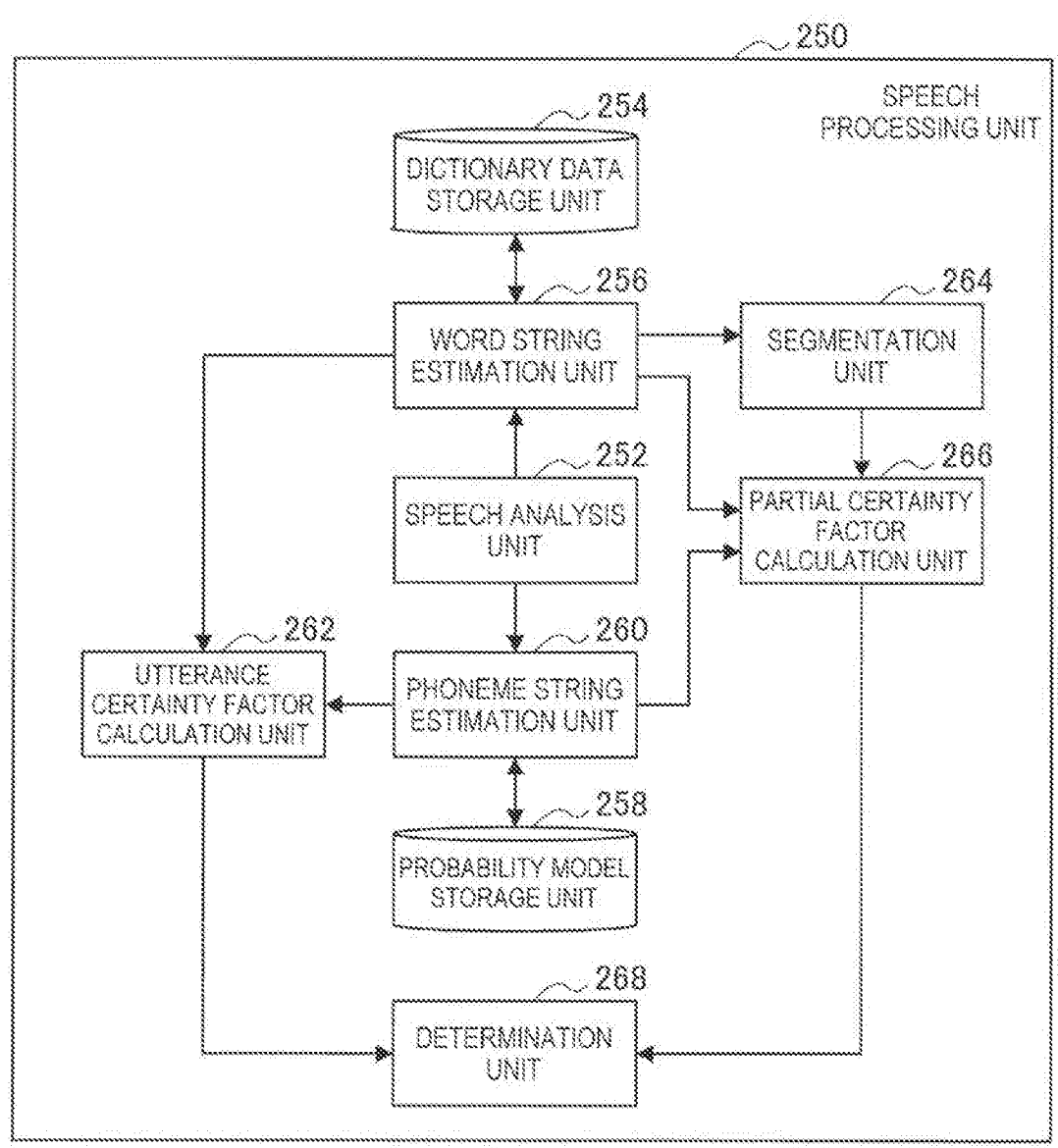
FIG. 5 is a diagram illustrated to describe a detailed function of a speech processing unit.

FIG. 5 is a diagram illustrated to describe detailed functions of the speech processing unit 250. As illustrated in FIG. 5, the speech processing unit 250 includes a speech analysis unit 252, a dictionary data storage unit 254, a word string estimation unit 256, a probability model storage unit 258, a phoneme string estimation unit 260, an utterance certainty factor calculation unit 262, a segmentation unit 264, a partial certainty factor calculation unit 266, and a determination unit 268.

(Speech Analysis Unit)

The speech analysis unit 252 processes and analyzes the speech data supplied from the sound pickup unit 220 to obtain a sequence X of acoustic feature quantities corresponding to the input speech.

(Dictionary Data Storage Unit and Word String Estimation Unit)

The dictionary data storage unit 254 stores acoustic data for each of a plurality of word strings. In one example, as described with reference to Formula 1, the word string estimation unit 256 refers to the dictionary data storage unit 254 and estimates a word string having the highest likelihood equivalent to the sequence X of acoustic feature quantities supplied from the speech analysis unit 252. The word string estimated by the word string estimation unit 256 is hereinafter also referred to as a maximum likelihood word string.

(Probability Model Storage Unit and Phoneme String Estimation Unit)

The probability model storage unit 258 stores an n-gram probability expressing the naturalness of coupling between phonemes for each combination of phonemes. In one example, as described with reference to Formulas 2 and 3, the phoneme string estimation unit 260 refers to the probability model storage unit 258 and estimates a phoneme string having the highest likelihood equivalent to the sequence X of acoustic feature quantities supplied from the speech analysis unit 252. The phoneme string estimated by the phoneme string estimation unit 260 is hereinafter also referred to as a maximum likelihood phoneme string.

(Utterance Certainty Factor Calculation Unit)

As shown in Formula 4, the utterance certainty factor calculation unit 262 calculates a difference in log likelihood between the maximum likelihood word string and the maximum likelihood phoneme string as a certainty factor (utterance certainty factor) in which contents of utterance are equivalent to the maximum likelihood word string.

(Segmentation Unit)

The segmentation unit 264 segments the maximum likelihood word string estimated by the word string estimation unit 256 into two or more element parts. Then, the segmentation unit 264 supplies information indicating the start timing and the end timing of each element part to the partial certainty factor calculation unit 266. A specific example of processing by the segmentation unit 264 is now described with reference to FIG. 6.

Figure 6:
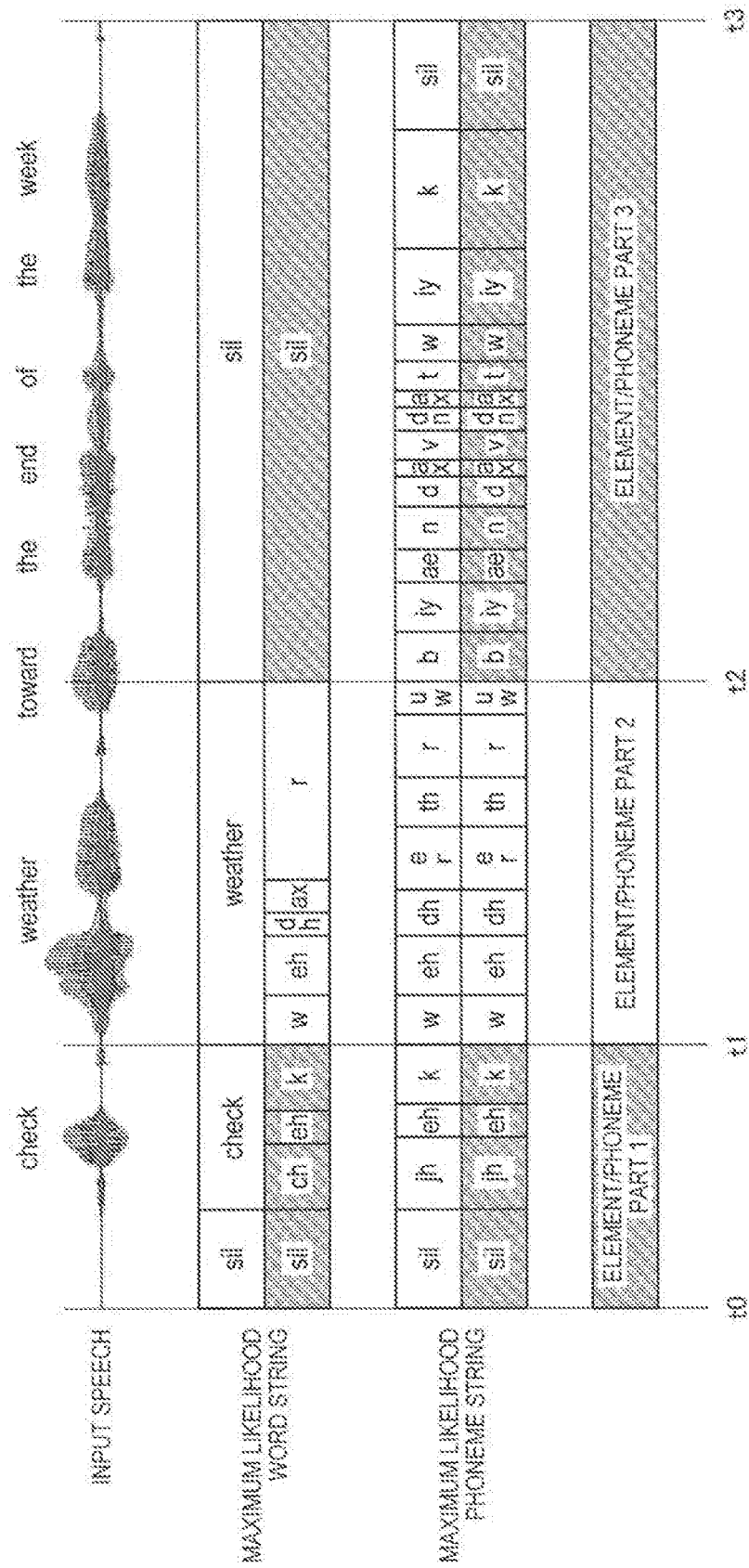
FIG. 6 is a diagram illustrated to describe an example of segmentation of a maximum likelihood word string.

FIG. 6 is a diagram illustrated to describe an example of segmentation of the maximum likelihood word string. More specifically, FIG. 6 illustrates an example in which the user utters "check weather toward the end of the week" and the word string estimation unit 256 estimates "check weather" as the maximum likelihood word string. Moreover, each word string includes a silent part at the beginning and end, in addition to the word part.

In the example illustrated in FIG. 6, the segmentation unit 264 segments the maximum likelihood word string into an element part 1 including a silent part at the beginning and "check", an element part 2 including "weather", and an element part 3 including a silent part at the end in accordance with a predetermined segmentation rule. Moreover, although the input speech exists in the section corresponding to the element part 3, this section is a section after the last word of the maximum likelihood word string, so it is dealt with as a silent part in the segmentation of the maximum likelihood word string. Then, information indicating t0, t1, t2, and t3, which are the start timing and the end timing of the input speech of each element part, is supplied to the partial certainty factor calculation unit 266. The maximum likelihood phoneme string is similarly segmented into a phoneme part 1, a phoneme part 2, and a phoneme part 3 on the basis of the information indicating these timings. Details of the segmentation rule will be described later.

(Partial Certainty Factor Calculation Unit)

The partial certainty factor calculation unit 266 calculates a certainty factor in which contents of each element part are equivalent to contents of the corresponding part in the input speech for each element part constituting the maximum likelihood word string. In one example, the partial certainty factor calculation unit 266 calculates the certainty factor for each element part on the basis of the relationship between the likelihood of each element part and the likelihood of a phoneme part corresponding to each element part. The partial certainty factor calculation unit 266 can calculate the certainty factor, $c_i$, for each element part as expressed in Formula 5 below.

[Math. 5]

$$c_i = \frac{\log(p(\hat{l}_i \mid X_i)) - \log(p(\hat{l}_i^{oov} \mid X_i))}{|X_i|} \quad (5)$$

In Formula 5, li denotes the $i^{th}$ element part, loovi denotes the $i^{th}$ phoneme part, Xi denotes the $i^{th}$ acoustic feature quantity part, and denominator indicates normalization in a length (frame length) of an element part. Furthermore, as shown in Formula 6, the partial certainty factor calculation unit 266 specifies the smallest partial minimum certainty factor, cword, among the certainty factors, ci, of each element part.

[Math. 6]

$$c_{word} = \min_i c_i \quad (6)$$

In the example illustrated in FIG. 6, it is assumed that the certainty factor of the element part 3 that is different in the maximum likelihood phoneme string from the maximum likelihood word string among the certainty factors, ci, of the element parts 1 to 3 is specified as the partial minimum certainty factor, cword. By focusing on the partial minimum certainty factor, cword, it is possible to verify utterance with more accuracy.

Moreover, in a case where the likelihood is obtained for each part (e.g., every 10 ms) of the maximum likelihood word string in the process of estimating the maximum likelihood word string, the partial certainty factor calculation unit 266 can calculate the likelihood of each element part by using the likelihood for each of the parts. Likewise, in a case where the likelihood is obtained for each part (e.g., every 10 ms) of the maximum likelihood phoneme string in the process of estimating the maximum likelihood phoneme string, the partial certainty factor calculation unit 266 can calculate the likelihood of each phoneme part by using the likelihood for each part.

Further, the partial certainty factor calculation unit 266 can obtain a score, s, expressed within the range of 0 to 1 by applying the certainty factor, ci, for each element part to a sigmoid function as expressed in Formula 7. This score, s, has an advantage that it is easier to use in another application rather than the certainty factor, ci.

[Math. 7]

$$s = \frac{1}{1 + \exp\left(-\sum_i w_i c_i + \delta\right)} \quad (7)$$

(Determination Unit)

The determination unit 268 determines how to deal with the maximum likelihood word string on the basis of the utterance certainty factor calculated by the utterance certainty factor calculation unit 262 and the partial minimum certainty factor specified by the partial certainty factor calculation unit 266. In one example, the determination unit 268 can determine to use the maximum likelihood word string as the speech recognition result on the basis of the fact that the utterance certainty factor is equal to or more than a threshold th1 and the partial minimum certainty factor is equal to or more than a threshold th2. The determination unit 268 can determine to reject the maximum likelihood word string on the basis of the fact that the utterance certainty factor is less than the threshold th1 or the partial minimum certainty factor is less than the threshold th2. In the case where the maximum likelihood word string is rejected on the basis of determination with the thresholds, the determination unit 268 can determine to use the server recognition result received from the server 30 in the hybrid mode. The advantageous effects of utilizing the partial minimum certainty factor in addition to the utterance certainty factor are described.

Figure 7:
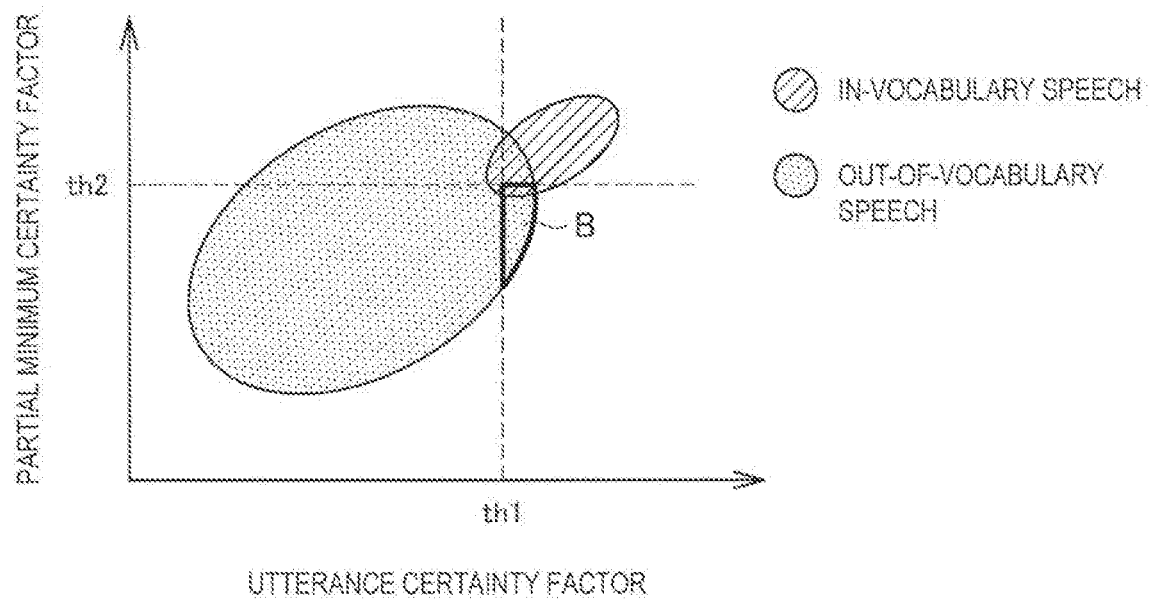
FIG. 7 is a diagram illustrated to describe an example of distribution of an utterance certainty factor and a partial minimum certainty factor of in-vocabulary speech and out-of-vocabulary speech.

FIG. 7 is a diagram illustrated to describe an example of distribution of the utterance certainty factor and the partial minimum certainty factor for in-vocabulary speech and out-of-vocabulary speech. In the case where only the fact that the utterance certainty factor is equal to or more than the threshold th1 is a condition to use the maximum likelihood word string, out-of-vocabulary speech included in a region B illustrated in FIG. 7 is dealt with as in-vocabulary speech, so erroneous speech recognition result will be used. On the other hand, it is possible to reject the erroneous speech recognition result for the out-of-vocabulary speech included in the region B by including additionally the fact that the partial minimum certainty factor is equal to or more than the threshold th2 to the condition. In other words, according to the present embodiment, it is possible to obtain a more precise certainty factor (partial minimum certainty factor), thereby performing the determination of whether or not the uttered input speech is the in-vocabulary speech with higher accuracy.

Figure 8:
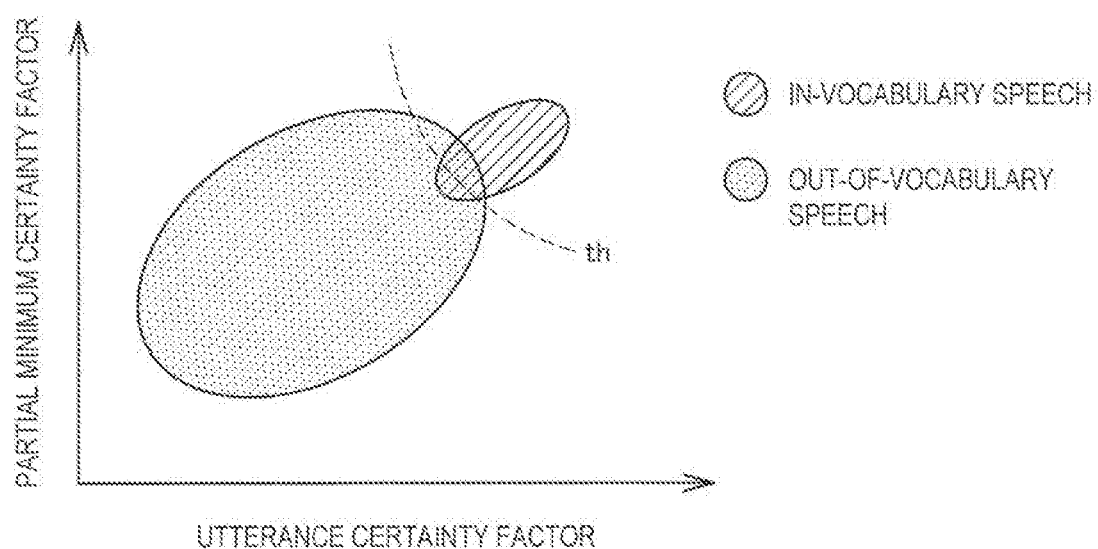
FIG. 8 is a diagram illustrated to describe a modification of a threshold of determination for a certainty factor.

Moreover, although FIG. 7 illustrates the example in which the thresholds are linear, the use of a discriminative classifier such as a support vector machine (SVM) or a deep neural network (DNN) makes it possible to implement a nonlinear threshold, in one example, as illustrated in FIG. 8.

Further, although the above description is given of the example in which the determination unit 268 determines whether or not to use the maximum likelihood word string as the speech recognition result by using both the utterance certainty factor and the partial minimum certainty factor, the embodiment of the present disclosure is not limited to this example. In one example, the determination unit 268 can determine whether or not to use the maximum likelihood word string as the speech recognition result, using the partial minimum certainty factor without using the utterance certainty factor.

(Segmentation Processing)

The above description is given of the functions of the speech processing unit 250. Then, a specific example of the segmentation processing of the maximum likelihood word string by the segmentation unit 264 is described.

The segmentation unit 264 segments the maximum likelihood word string at the boundary between words. In this event, the segmentation unit 264 can segment the maximum likelihood word string in word units. However, the word "a" includes one phoneme of "ax" and the word "the" includes two phonemes of "dh ah", and if a word whose number of phonemes is small and the amount of information is insufficient as described above constitutes one element part, there is concern that a stable result fails to be obtained.

Figure 9:
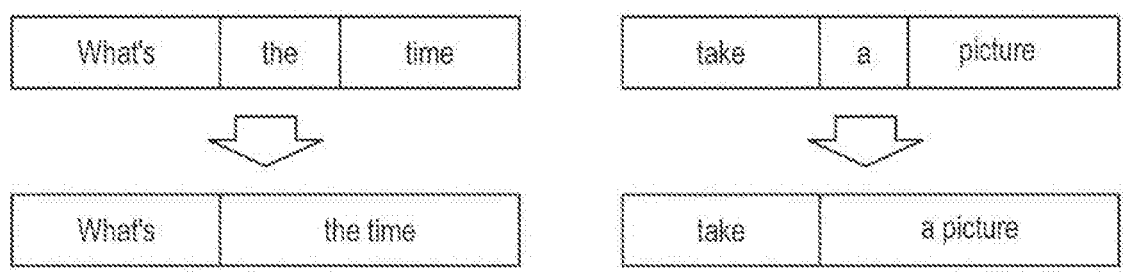
FIG. 9 is a diagram illustrated to describe an example of segmentation of a maximum likelihood word string.

Thus, the maximum likelihood word string can be segmented in such a way that a word whose number of phonemes is equal to or less than a predetermined number constitutes one element part together with the next adjacent word. In one example, as illustrated in FIG. 9, the segmentation unit 264 can segment the maximum likelihood word string "what's the time" into "what's" and "the time", and can segment the maximum likelihood word string "take a picture" into "take" and "a picture".

Figure 10:
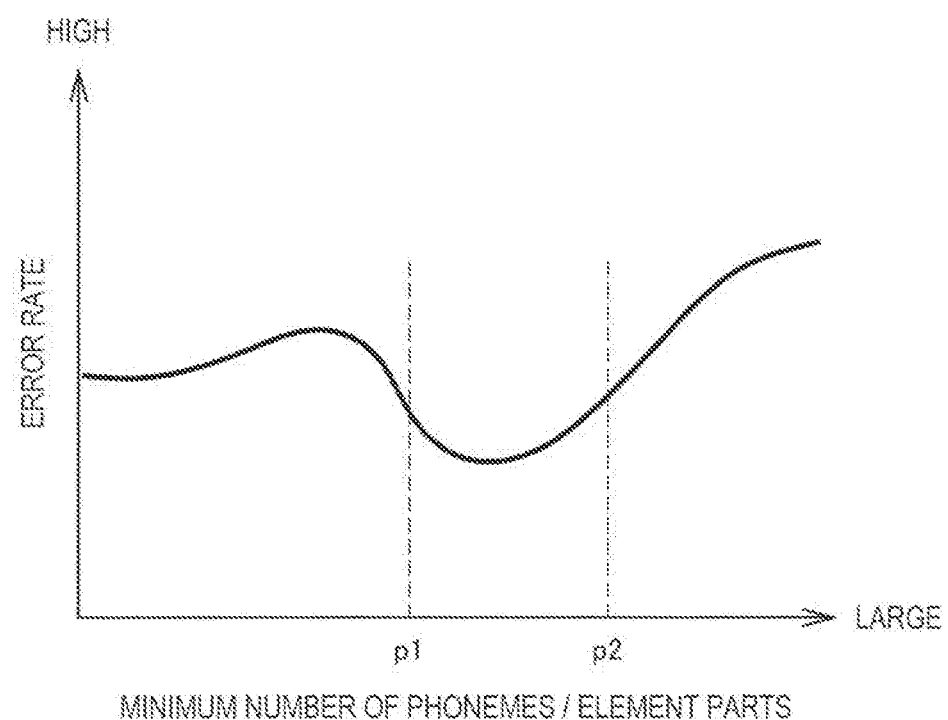
FIG. 10 is a diagram illustrated to describe a relationship between an error rate and the minimum number of phonemes/element parts.

Here, the error rate for determination of use or rejection of the maximum likelihood word string varies depending on a value to be set as the predetermined number. When the predetermined number is set to various values for a population of the input speech, in one example, a tendency of error rates as shown in FIG. 10 is obtained. This tendency indicates that the error rate decreases after the error rate increases with increase of the minimum number of phonemes (predetermined number+1)/element parts, and then the error rate again increases. Thus, it is desirable that the minimum number of phonemes (predetermined number+1) is set within the range of p1 to p2 where the error rate decreases and is a relatively low value. An example of the range of p1 to p2 includes a range of "4" to "6", and in particular, the minimum number of phonemes can be "5" (the predetermined number is "4"). Moreover, in a case where the number of phonemes does not exceed the predetermined number even in the sum of the word having the number of phonemes equal to or less than the predetermined number and the next word adjacent thereto, the segmentation unit 264 can incorporate subsequent words into one element part until the number of phonemes exceeds the predetermined number.

Further, the segmentation unit 264 deals with the silent part as one word in the segmentation of the maximum likelihood word string. Although there is no number of phonemes in the silent part, the segmentation unit 264 can deal with the silent part as a word having the number of phonemes corresponding to the duration of the silent part. Thus, the silent part that is dealt with as a word having a predetermined number or less of phonemes constitutes one element part (e.g., the element part 1 illustrated in FIG. 6) together with the next adjacent word. The silent part that is dealt with as a word having a predetermined number or more of phonemes constitutes one element part (e.g., the element part 1 illustrated in FIG. 6) alone.

<4. Operation>

The functions of the speech processing apparatus 20 and the server 30 according to the embodiment of the present disclosure are described above. Subsequently, the operation of the speech processing apparatus 20 according to the embodiment of the present disclosure is summarized with reference to FIG. 11.

Figure 11:
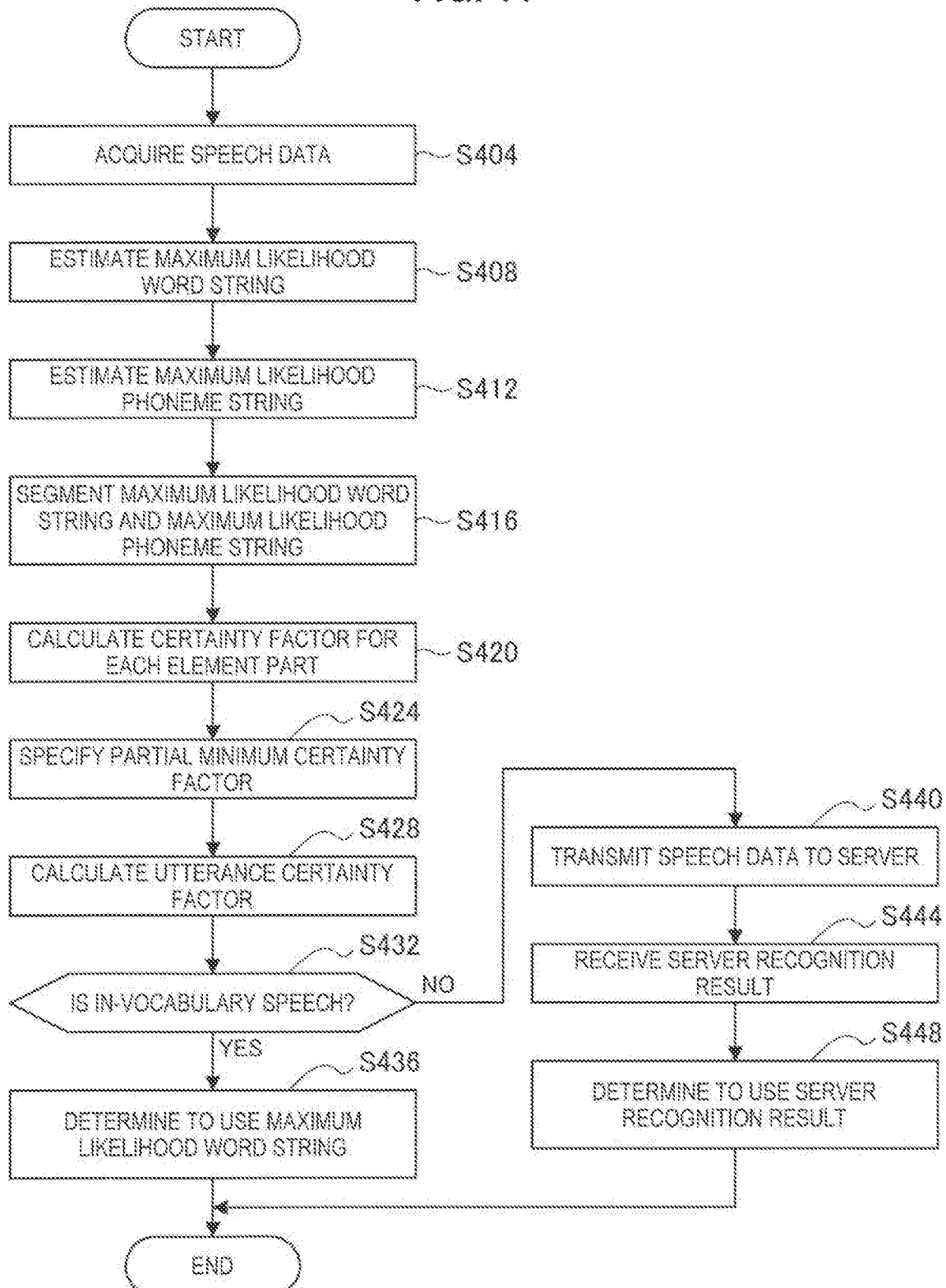
FIG. 11 is a flowchart illustrating the operation of the speech processing apparatus according to an embodiment of the present disclosure.

FIG. 11 is a flowchart illustrating the operation of the speech processing apparatus 20 according to the embodiment of the present disclosure. As illustrated in FIG. 11, when the sound pickup unit 220 first acquires speech data (S404), the word string estimation unit 256 refers to the dictionary data storage unit 254 and estimates a maximum likelihood word string having the highest likelihood equivalent to the sequence X of acoustic feature quantities supplied from the speech analysis unit 252 (S408). In addition, the phoneme string estimation unit 260 refers to the probability model storage unit 258 and estimates a maximum likelihood phoneme string having the highest likelihood equivalent to the sequence X of acoustic feature quantities supplied from the speech analysis unit 252 (S412).

Then, the segmentation unit 264 segments the maximum likelihood word string into a plurality of element parts, and the partial certainty factor calculation unit 266 segments the maximum likelihood phoneme string into a plurality of phonemic parts corresponding to the respective element parts (S416). Subsequently, the partial certainty factor calculation unit 266 calculates a certainty factor in which contents of each element part are equivalent to contents of the corresponding part in the input speech for each element part constituting the maximum likelihood word string (S420). Furthermore, the partial certainty factor calculation unit 266 specifies the smallest partial minimum certainty factor among the certainty factors, $c_i$, of each element part (S424). On the other hand, the utterance certainty factor calculation unit 262 calculates a difference in log likelihood between the maximum likelihood word string and the maximum likelihood phoneme string as a certainty factor (utterance certainty factor) in which contents of utterance are equivalent to the maximum likelihood word string (S428).

The determination unit 268 determines whether or not contents of the utterance of the user are the maximum likelihood word string that is the in-vocabulary utterance on the basis of the utterance certainty factor calculated by the utterance certainty factor calculation unit 262 and the partial minimum certainty factor calculated by the partial certainty factor calculation unit 266 (S432). Then, in a case where the determination unit 268 determines that the contents of the utterance of the user are the in-vocabulary utterance (Yes in S432), the determination unit 268 determines to use the maximum likelihood word string (S436). On the other hand, in a case where it is determined that the contents of the utterance of the user are not the in-vocabulary utterance (No in S432), the communication unit 240 transmits the speech data to the server 30 (S440) and receives the server recognition result from the server 30 in the hybrid mode (S444). Then, the determination unit 268 determines to use the server recognition result (S448). Moreover, the communication unit 240 can transmit the speech data to the server 30 in parallel with the processing of S408 to S432.

Further, although the above description is given of the example in which the determination of S432 is performed using the partial minimum certainty factor, the determination of S432 can be performed using the certainty factor of each element part. A different number of phonemes is applied to the minimum number of phonemes for each element part, the partial certainty factor calculation unit 266 can calculate the certainty factor for each element part in a case where each number of phonemes is applied, and the determination unit 268 can perform the determination of S432 using the certainty factor of each element part in the case where each number of phonemes is applied.

<5. Application Example>

The embodiment of the present disclosure is described above. Subsequently, an application example of the embodiment of the present disclosure is described. The application example relates to an application that utilizes the functions of the speech processing unit 250 described above.

Figure 12:
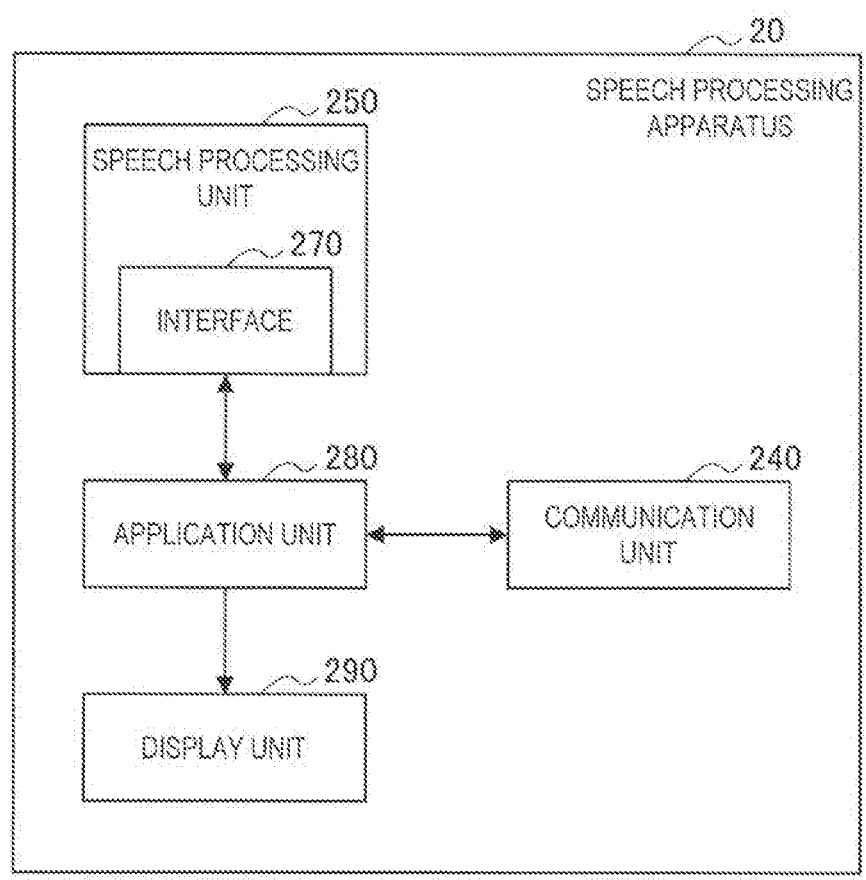
FIG. 12 is a diagram illustrated to describe a configuration of a speech processing apparatus according to an application example.

FIG. 12 is a diagram illustrated to describe the configuration of a speech processing apparatus 20 according to the application example. As illustrated in FIG. 12, the speech processing apparatus 20 according to the application example is an information processing apparatus including a communication unit 240, a speech processing unit 250, an application unit 280, and a display unit 290.

The display unit 290 displays various display screens under the control of the application unit 280.

The speech processing unit 250 has an interface 270, which receives a request from the application unit 280 and outputs information related to the maximum likelihood word string and the certainty factor for the input speech to the application unit 280.

The application unit 280 acquires the information related to the maximum likelihood word string and the certainty factor from the speech processing unit 250, and executes processing on the basis of the acquired information. Here, the application unit 280 can specify the output mode of a certainty factor. Examples of the output mode include an entire utterance mode, an element part (coarse) mode, an element part (fine) mode, or the like.

In the entire utterance mode, the application unit 280 acquires the utterance certainty factor in the entire utterance from the interface 270. In one example, the application unit 280 acquires the information shown below in JSON format for the utterance "check lap time". Moreover, the certainty factor (TotalScore) shown below is a score normalized by the operation expressed in Formula 7.

```
...
SpeechResult: check the time
TotalScore: 0.6
...
```

In the element part (coarse) mode, the application unit 280 acquires a certainty factor for each element part formed by connecting a word whose phoneme is equal to or less than a predetermined number with the next word from the interface 270. In one example, in a case where the element part (coarse) mode is specified, the application unit 280 acquires, in one example, the information shown below.

```
...
SpeechResult: check the time
TotalScore: 0.6
EachWord: {
    Word1: {
SpeechResult: Check
    Score: 0.8
        StartTime: 0.11
            EndTime: 0.56
    }
    Word2: {
        SpeechResult: the time
        Score: 0.2
StartTime: 0.56
        EndTime: 1.25
    }
}
...
```

In the element part (fine) mode, the application unit 280 acquires a certainty factor for each element part corresponding to each word constituting the maximum likelihood word string from the interface 270. In one example, in a case where the element part (fine) mode is specified, the segmentation unit 264 segments the maximum likelihood word string in word units, and the application unit 280 acquires, in one example, the information shown below.

```
...
SpeechResult: check the time
TotalScore: 0.6
EachWord: {
    Word1: {
SpeechResult: Check
    Score: 0.8
        StartTime: 0.11
            EndTime: 0.56
    }
    Word2: {
        SpeechResult: the
        Score: 0.1
StartTime: 0.56
        EndTime: 0.72
```

```
    }
    Word3: {
        SpeechResult: time
        Score: 0.7
        StartTime: 0.72
        EndTime: 1.25
    }
}
...
```

In one example, in a case where the partial minimum certainty factor is equal to or more than the threshold, the application unit 280 determines to use the maximum likelihood word string. On the other hand, in a case where there is an element part having certainty factor less than the threshold, the application unit 280 can execute various processing operations to achieve correct recognition.

In one example, in a case where the application unit 280 acquires the speech data indicating the input speech from the interface 270, the application unit 280 can request the server 30 via the communication unit 240 to recognize the data part corresponding to the element part whose certainty factor is less than the threshold among the speech data. In the example of the information obtained in the case of the element part (coarse) mode described above, the certainty factor of the element part "the time" is low. Thus, the application unit 280 can request the server 30 to recognize the data part corresponding to the element part "the time" among the speech data. By requesting the server 30 to recognize a part of the speech data in this manner, it is possible to reduce the communication traffic, communication latency, and processing load on the server 30.

Alternatively, the application unit 280 can have a function as a re-utterance induction unit that induces re-utterance of an element part whose certainty factor is less than the threshold. In one example, the application unit 280 can cause the display unit 290 to display a screen that induces the re-utterance of an element part whose certainty factor is less than the threshold. In the example of the information obtained in the case of the element part (coarse) mode described above, the certainty factor of the element part "the time" is low. Thus, the application unit 280 can cause the display unit 290 to display a screen including a message "what do you want to check?" to induce re-utterance of the element part "the time". Such a configuration is expected to achieve the correct recognition result in the entire utterance by re-utterance of the element part with low certainty factor.

<6. Hardware Configuration>

The embodiments of the present disclosure are described above. The information processing such as estimation of maximum likelihood word string and calculation of certainty factor as described above is achieved by cooperation of software and hardware of the speech processing apparatus 20 described below.

Figure 13:
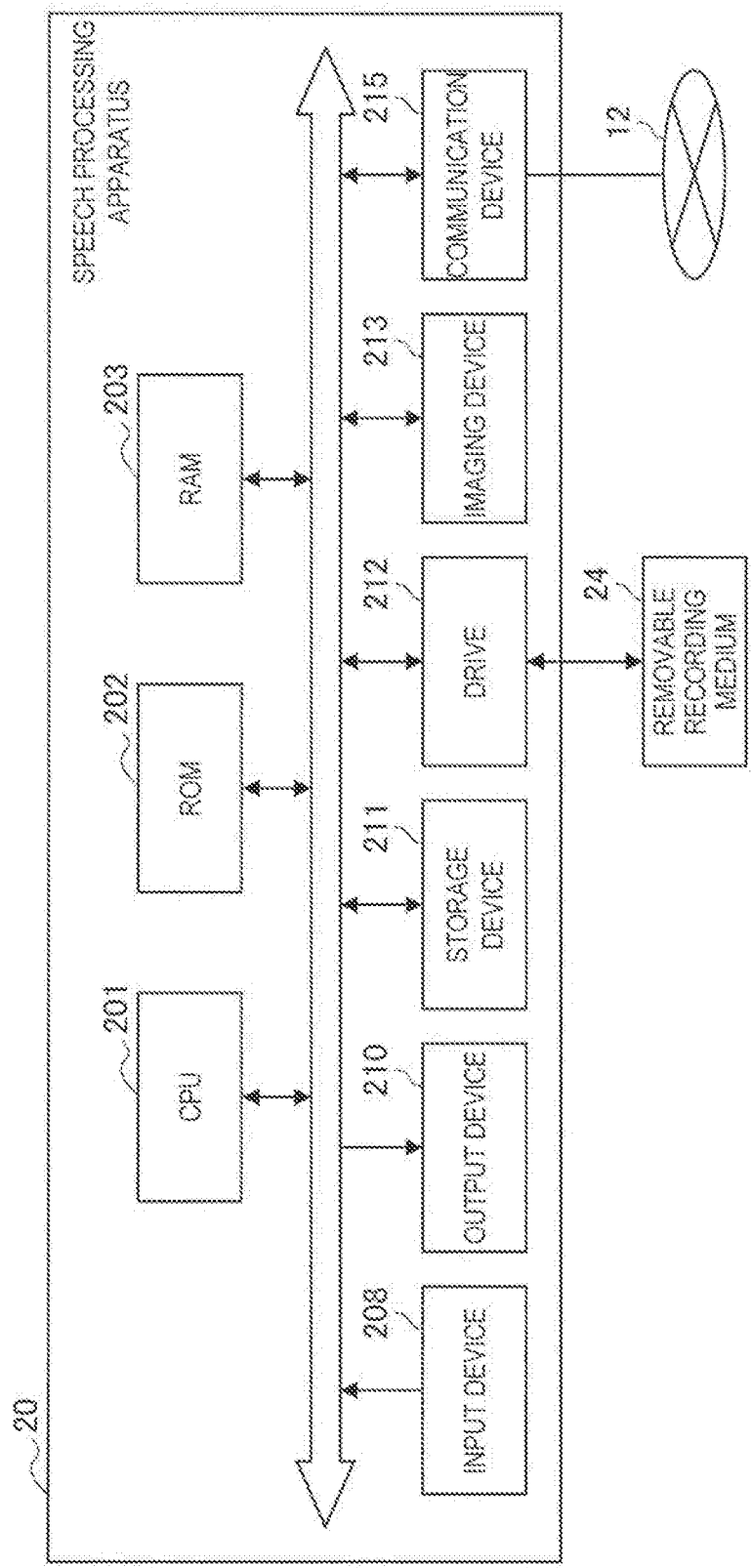
FIG. 13 is a diagram illustrated to describe a hardware configuration of the speech processing apparatus.

FIG. 13 is a diagram illustrated to describe the hardware configuration of the speech processing apparatus 20. As illustrated in FIG. 13, the speech processing apparatus 20 includes a central processing unit (CPU) 201, a read only memory (ROM) 202, a random access memory (RAM) 203, an input device 208, an output device 210, a storage device 211, a drive 212, an imaging device 213, and a communication device 215.

The CPU 201 functions as an operation processing device and a control device, and controls all the operations within the speech processing apparatus 20 in accordance with various programs. In addition, the CPU 201 can be a microprocessor. The ROM 202 stores programs and operation parameters used by the CPU 201. The RAM 203 temporarily stores programs used in the execution of the CPU 201 or stores parameters or the like that are appropriately changed in the execution thereof. These components are mutually connected through a host bus including a CPU bus or the like. The cooperation of the CPU 201, the ROM 202, and the RAM 203 with software makes it possible to implement the functions of the speech processing unit 250.

The input device 208 includes an input means, an input control circuit, or the like. The input means is used for a user to input information, such as a mouse, a keyboard, a touch panel, a button, a microphone, a switch, or a lever. The input control circuit generates an input signal on the basis of an input by the user and outputs it to the CPU 201. The user of the speech processing apparatus 20 is capable of operating the input device 208 to input various data to the speech processing apparatus 20 or to instruct it to perform processing operations.

The output device 210 includes, in one example, a display device, such as a liquid crystal display (LCD) device, an organic light emitting diode (OLED) device, or a lamp. Furthermore, the output device 210 includes a sound output device, such as a speaker or a headphone. In one example, the display device displays a captured image or a generated image. On the other hand, the sound output device converts speech data or the like into sound and outputs it.

The storage device 211 is a device for data storage constituted as an example of a storage unit of the speech processing apparatus 20 according to the present embodiment. The storage device 211 can include a storage medium, a recording device that records data to the storage medium, a reading device that reads data from the storage medium, and an erasure device that erases data recorded in the storage medium. This storage device 211 stores programs executed by the CPU 201 and various data.

The drive 212 is a reader-writer for the storage medium, and is built into the speech processing apparatus 20 or is externally attached thereto. The drive 212 reads information recorded on a removable storage medium 24, such as a mounted magnetic disk, optical disk, magneto-optical disk, or semiconductor memory, and outputs it to the RAM 203. In addition, the drive 212 is also capable of writing information to the removable storage medium 24.

The imaging device 213 includes an imaging optical system such as a photographic lens for focusing light and a zoom lens, and a signal conversion device such as a charge coupled device (CCD) and a complementary metal oxide semiconductor (CMOS). The imaging optical system focuses light originating from a subject to form a subject image on a signal converting portion, and the signal conversion device converts the formed subject image into an electrical image signal.

The communication device 215 is, in one example, a communication interface constituted by a communication device or the like for connecting to the communication network 12. In addition, the communication device 215 can be a wireless local area network (LAN) compatible communication device, a long-term evolution (LTE) compatible communication device, or a wired communication device that performs wired communication.

<7. Concluding Remarks>

As described above, according to the embodiment of the present disclosure, the certainty factor for each element part constituting the maximum likelihood word string, which is more precise than the certainty factor in the entire maximum likelihood word string, is calculated. Thus, it is possible to determine more accurately whether or not the uttered input speech is the in-vocabulary speech.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the dictionary data stored in the dictionary data storage unit 254 illustrated in FIG. 5 can be changed depending on the context. Specifically, the artist name of the music recorded in the speech processing apparatus 20 can be automatically added to the dictionary data, or the place name included in the dictionary data can be changed depending on the place of use.

Further, in a case where the user utters the speech including an artist name that is not in the dictionary data like "play music by xxx", the certainty factor of the element part corresponding to "xxx" indicating the artist name decreases, but it is possible to recognize that the user wants to play a piece of music. In this case, the speech processing apparatus 20 can extract the piece of music on the basis of the user's preference or playback history, and start playing back of the extracted piece of music. In addition, in a case where the user utters the speech "how to get to zzz" including a place name "zzz" that the user does not tell at a travel destination, the certainty factor of the element part corresponding to "zzz" can decrease, but the determination unit 268 can determine to use the maximum likelihood word string by lowering the threshold of the partial minimum certainty factor based on being the travel destination. In this way, the certainty factor for each element part can be used for various applications.

Further, the above description is given of the example in which the functions of the segmentation unit 264 and the partial certainty factor calculation unit 266 are provided in the speech processing apparatus 20. However, at least a part of the functions of the speech processing units 250 such as the segmentation unit 264 and the partial certainty factor calculation unit 266 can be provided in the server 30.

Further, it may not be necessary to chronologically execute respective steps in the processing of the speech processing apparatus 20 and the server 30 in this specification, in the order described in the flowcharts. In one example, the respective steps in the processing of the speech processing apparatus 20 and the server 30 may be processed in the order different from the order described in the flowcharts, or may also be processed in parallel.

Furthermore, it is possible to create a computer program for causing hardware components, such as the CPU 201, the ROM 202, and the RAM 203 incorporated in the speech processing apparatus 20 and the server 30 to implement the functions equivalent to the respective components of the speech processing apparatus 20 and the server 30 described above. In addition, a storage medium on which the computer program is stored is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A speech processing apparatus including:

a word string estimation unit configured to estimate a word string equivalent to input speech among word strings included in dictionary data; and a calculation unit configured to calculate, for an element part constituting the word string estimated by the word string estimation unit, a certainty factor in which a content of the element part is equivalent to a content of a corresponding part in the input speech.

(2)

The speech processing apparatus according to (1), further including:

a segmentation unit configured to segment the word string estimated by the word string estimation unit into two or more element parts, in which the calculation unit calculates the certainty factor for the two or more element parts.

(3)

The speech processing apparatus according to (2), in which the segmentation unit segments the word string in such a way that a word whose number of phonemes is less than a predetermined number constitutes one element part together with an adjacent word and a word whose number of phonemes is equal to or more than the predetermined number constitutes one element part.

(4)

The speech processing apparatus according to (3), in which the segmentation unit deals with a non-speech part as a word having the number of phonemes corresponding to a duration of the non-speech part in the word string.

(5)

The speech processing apparatus according to any one of (1) to (4), further including:

a phoneme string estimation unit configured to estimate a phoneme string equivalent to the input speech on the basis of a probability model of phoneme transition, in which the calculation unit calculates the certainty factor on the basis of a relationship between likelihood of an element part constituting the word string and likelihood of a phoneme part in the phoneme string corresponding to the element part.

(6)

The speech processing apparatus according to any one of (1) to (5), further including:

a determination unit configured to determine how to deal with the word string estimated by the word string estimation unit on the basis of a result of calculation of the certainty factor by the calculation unit.

(7)

The speech processing apparatus according to (6), in which the determination unit determines to use, as a speech recognition result, the word string estimated by the word string estimation unit on the basis of a fact that a smallest certainty factor among one or more certainty factors calculated by the calculation unit is equal to or more than a threshold, and determines not to use, as a speech recognition result, the word string estimated by the word string estimation unit on the basis of a fact that the smallest certainty factor is less than the threshold.

(8)

The speech processing apparatus according to (6) or (7), in which the determination unit determines to use, as a speech recognition result, the word string estimated by the word string estimation unit on the basis of a fact that a smallest certainty factor among one or more certainty factors calculated by the calculation unit is equal to or more than a threshold and the certainty factor for the entire word string is equal to or more than a predetermined value, and determines not to use, as a speech recognition result, the word string estimated by the word string estimation unit on the basis of a fact that the smallest certainty factor is less than the threshold or the certainty factor for the entire word string is less than a predetermined value.

(9)

The speech processing apparatus according to any one of (6) to (8), further including:

a communication unit configured to transmit speech data indicating the input speech to an external device and receive information based on speech recognition for the speech data from the external device, in which the determination unit determines to use the information based on speech recognition received from the external device in a case where the determination unit determines not to use the word string estimated by the word string estimation unit as a speech recognition result.

(10)

The speech processing apparatus according to any one of (1) to (9), further including:

a re-utterance induction unit configured to induce, in a case where there is an element part whose certainty factor calculated by the calculation unit is less than a threshold, re-utterance of speech corresponding to the element part.

(11)

The speech processing apparatus according to any one of (1) to (10), further including:

an interface configured to output the word string estimated by the word string estimation unit to an application that operates on the basis of the input speech together with a certainty factor constituting the word string.

(12)

An information processing apparatus including:

an acquisition unit configured to acquire a word string obtained by estimation of input speech together with a certainty factor in which a content of an element part constituting the word string is equivalent to a content of a corresponding part in the input speech; and a determination unit configured to determine how to deal with the word string on the basis of information indicating the certainty factor acquired by the acquisition unit.

(13)

The information processing apparatus according to (12), in which the acquisition unit further acquires speech data indicating the input speech, and the determination unit determines to request an external device to recognize speech data corresponding to an element part in which the certainty factor is less than a threshold.

(14)

The information processing apparatus according to (12), in which the determination unit determines to induce re-utterance of speech corresponding to an element part in which the certainty factor is less than a threshold.

(15)

A speech processing method including:

estimating a word string equivalent to input speech among word strings included in dictionary data; and calculating, by a processor, for an element part constituting the estimated word string, a certainty factor in which a content of the element part is equivalent to a content of a corresponding part in the input speech.

(16)

An information processing method including:
acquiring a word string obtained by estimation of input speech together with a certainty factor in which a content of an element part constituting the word string is equivalent to a content of a corresponding part in the input speech; and
determining, by a processor, how to deal with the word string on the basis of information indicating the acquired certainty factor.

REFERENCE SIGNS LIST 20 speech processing apparatus
30 server
220 sound pickup unit
236 operation mode control unit
240 communication unit
250 speech processing unit
252 speech analysis unit
254 dictionary data storage unit
256 word string estimation unit
258 probability model storage unit
260 phoneme string estimation unit
262 utterance certainty factor calculation unit
264 segmentation unit
266 partial certainty factor calculation unit
268 determination unit
270 interface
280 application unit
290 display unit
324 communication unit
340 speech recognizer

The invention claimed is:

1. A speech processing apparatus, comprising:
a central processing unit (CPU) configured to:
estimate a word string among a plurality of word strings included in dictionary data, wherein the word string is equivalent to input speech;
segment the estimated word string into a plurality of element parts, wherein
a word having phonemes one of equal to or greater than a specific number constitutes a first element part of the plurality of element parts, and
a word, having phonemes less than the specific number, together with an adjacent word constitutes a second element part of the plurality of element parts; and
calculate a certainty factor for each element part of the plurality of element parts constituting the estimated word string,
wherein a content of each element part of the plurality of element parts is equivalent to a content of a corresponding part in the input speech.

2. The speech processing apparatus according to claim 1, wherein the CPU is further configured to deal with a non-speech part of the input speech as a word having a number of phonemes corresponding to a duration of the non-speech part in the word string.

3. The speech processing apparatus according to claim 1, wherein the CPU is further configured to:
estimate a phoneme string equivalent to the input speech based on a probability model of phoneme transition; and
calculate the certainty factor based on a relationship between likelihood of each element part of the plurality of element parts and likelihood of a phoneme part in the phoneme string corresponding to each element part of the plurality of element parts.

4. The speech processing apparatus according to claim 1, wherein the CPU is further configured to determine how to deal with the estimated word string based on a result of calculation of the certainty factor.

5. The speech processing apparatus according to claim 4, wherein the CPU is further configured to:
determine to use, as a speech recognition result, the estimated word string based on the certainty factor of each element part of the plurality of element parts being one of is equal to or more than a threshold; and
determine to reject, as the speech recognition result, the estimated word string based on the certainty factor of at least one element part of the plurality of element parts being less than the threshold.

6. The speech processing apparatus according to claim 4, wherein the CPU is further configured to:
determine to use, as a speech recognition result, the estimated word string based on
the certainty factor of each element part of the plurality of element parts being one of equal to or more than a threshold, and
a certainty factor for the entire word string being one of equal to or more than a specific value; and
determine to reject, as the speech recognition result, the estimated word string based on one of
the certainty factor of at least one element part of the plurality of element parts being less than the threshold or
the certainty factor for the entire word string being less thana the specific value.

7. The speech processing apparatus according to claim 4, wherein the CPU is further configured to:
transmit speech data indicating the input speech to an external device;
receive information based on speech recognition for the speech data from the external device; and
determine to use the information based on the speech recognition received from the external device, wherein the determination to use the information is based on a determination of a rejection of the estimated word string as a speech recognition result.

8. The speech processing apparatus according to claim 1, wherein the CPU is further configured to:
re-utterance of speech corresponding to a specific element part of the plurality of element parts based on the certainty factor of the specific element part being less than a threshold.

9. The speech processing apparatus according to claim 1, further comprising:
an interface configured to output each of the estimated word string and the certainty factor of each element part of the plurality of element parts that constitutes the word string to an application that operates based on the input speech.

10. An information processing apparatus, comprising:
a central processing unit (CPU) configured to:
acquire a word string obtained based on estimation of input speech together with a certainty factor of each element part of a plurality of element parts constituting the word string, wherein
a content of each element part of the plurality of element parts is equivalent to a content of a corresponding part in the input speech,
the word string is segmented into the plurality of element parts, a word having phonemes one of equal to or greater than a specific number constitutes a first element part of the plurality of element parts, and a word, having phonemes less than the specific number, together with an adjacent word constitutes a second element part of the plurality of element parts; and determine how to deal with the word string based on information indicating the acquired certainty factor.

11. The information processing apparatus according to claim 10, wherein the CPU is further configured to:

acquire speech data indicating the input speech; and request an external device to recognize the acquired speech data corresponding to a specific element part of the plurality of element parts in which the certainty factor is less than a threshold.

12. The information processing apparatus according to claim 10, wherein the CPU is further configured to induce re-utterance of speech corresponding to a specific element part of the plurality of element parts in which the certainty factor of the specific element part is less than a threshold.

13. A speech processing method, comprising:

estimating, by a processor of an information processing apparatus, a word string among a plurality of word strings included in dictionary data, wherein the word string is equivalent to input speech;

segmenting, by the processor, the estimated word string into a plurality of element parts, wherein a word having phonemes one of equal to or greater than a specific number constitutes a first element part of the plurality of element parts, and a word, having phonemes less than the specific number, together with an adjacent word constitutes a second element part of the plurality of element parts; and calculating, by the processor a certainty factor for each element part of the plurality of element parts constituting the estimated word string, wherein a content of each element part of the plurality of element parts is equivalent to a content of a corresponding part in the input speech.

14. An information processing method, comprising:

acquiring, by a processor of an information processing apparatus, a word string obtained based on estimation of input speech together with a certainty factor of each element part of a plurality of element parts constituting the word string, wherein a content of each element part of the plurality of element parts is equivalent to a content of a corresponding part in the input speech, the word string is segmented into the plurality of element parts, a word having phonemes one of equal to or greater than a specific number constitutes a first element part of the plurality of element parts, and a word, having phonemes less than the specific number, together with an adjacent word constitutes a second element part of the plurality of element parts; and determining, by the processor, how to deal with the word string based on a basis of information indicating the acquired certainty factor.

* * * * *